United States Patent
Remboski et al.

(10) Patent No.: US 12,498,037 B2
(45) Date of Patent: Dec. 16, 2025

(54) LUBRICANT SUPPORTED ELECTRIC MOTOR

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US)

(73) Assignee: Neapco Intellectual Property Holdings, LLC

( * ) Notice: Subject to any disclaimer, the term of this patent is extended or adjusted under 35 U.S.C. 154(b) by 352 days.

(21) Appl. No.: 18/063,133

(22) Filed: Dec. 8, 2022

(65) Prior Publication Data

US 2023/0103893 A1 Apr. 6, 2023

Related U.S. Application Data

(63) Continuation of application No. 16/144,002, filed on Sep. 27, 2018, now abandoned.

(Continued)

(51) Int. Cl.
*F16H 57/04* (2010.01)
*H02K 1/20* (2006.01)
(Continued)

(52) U.S. Cl.
CPC ......... *F16H 57/0476* (2013.01); *F16H 57/04* (2013.01); *F16H 57/0413* (2013.01);
(Continued)

(58) Field of Classification Search
CPC .. F16H 57/0476; F16H 57/04; F16H 57/0413; F16H 57/0441; H02K 5/203;
(Continued)

(56) References Cited

U.S. PATENT DOCUMENTS

| | | | |
|---|---|---|---|
| 7,955,208 B2 * | 6/2011 | Kinoshita | F16H 48/30 475/5 |
| 7,990,006 B2 * | 8/2011 | Stiesdal | F03D 80/70 310/90 |

(Continued)

FOREIGN PATENT DOCUMENTS

| | | | |
|---|---|---|---|
| CN | 104518640 A | * | 4/2015 |
| CN | 105406680 A | * | 3/2016 |

(Continued)

*Primary Examiner* — Jeremy A Luks
(74) *Attorney, Agent, or Firm* — Dickinson Wright PLLC

(57) ABSTRACT

A lubricant supported electric motor includes a static member and a movable member movably disposed within the static member to define a gap therebetween. The static member may be configured as a stator and the movable member may be configured as a rotor. The movable member may also be configured to move relative to the static member. The static member and movable member are configured to exert an electromagnetic force therebetween and convert electrical energy into mechanical energy and move the movable member. A lubricant is disposed in the gap between the static member and the movable member to support the movable member relative to the static member.

6 Claims, 3 Drawing Sheets

Related U.S. Application Data

(60) Provisional application No. 62/563,735, filed on Sep. 27, 2017.

(51) Int. Cl.
    *H02K 5/20*         (2006.01)
    *H02K 7/08*         (2006.01)
    *H02K 7/10*         (2006.01)
    *H02K 7/116*       (2006.01)
    *H02K 7/14*         (2006.01)
    *H02K 9/19*         (2006.01)
    *H02K 41/03*       (2006.01)

(52) U.S. Cl.
    CPC .......... *F16H 57/0441* (2013.01); *H02K 1/20* (2013.01); *H02K 5/203* (2021.01); *H02K 7/088* (2013.01); *H02K 7/1016* (2013.01); *H02K 7/116* (2013.01); *H02K 7/14* (2013.01); *H02K 9/19* (2013.01); *H02K 41/031* (2013.01); *H02K 2201/03* (2013.01)

(58) Field of Classification Search
    CPC .......... H02K 1/20; H02K 7/088; H02K 41/06; H02K 7/1016; H02K 7/1008; H02K 7/116; H02K 7/14; H02K 9/19; H02K 41/031; H02K 2201/03
    See application file for complete search history.

(56) References Cited

U.S. PATENT DOCUMENTS

| | | | |
|---|---|---|---|
| 8,157,036 B2 * | 4/2012 | Yogo | B60G 13/16 180/300 |
| 10,792,994 B2 * | 10/2020 | Taikou | B60K 17/043 |
| 2005/0168090 A1 * | 8/2005 | Gould | H02K 19/24 310/159 |

FOREIGN PATENT DOCUMENTS

| | | | | |
|---|---|---|---|---|
| CN | 104967277 B | * | 5/2017 | |
| JP | 2000095176 A | * | 4/2000 | |
| JP | 2014030297 A | * | 2/2014 | |
| WO | WO-2017175999 A1 | * | 10/2017 | ............... H02K 1/12 |

* cited by examiner

LUBRICANT SUPPORTED ELECTRIC MOTOR

CROSS-REFERENCE TO RELATED APPLICATIONS

This application is a continuation of U.S. patent application Ser. No. 16/144,002, filed on Sep. 27, 2018, which claims the benefit of U.S. Provisional Application Ser. No. 62/563,735, filed Sep. 27, 2017, the entirety of the applications hereby incorporated by reference as though fully set forth herein.

FIELD OF THE DISCLOSURE

The present disclosure relates to electric motors. More particularly, the present disclosure relates to electric motors with lubricant support between a rotor and stator of the electric motor.

BACKGROUND OF THE DISCLOSURE

This section of the written disclosure provides background information related to electric motors and is not necessarily prior art to the inventive concepts disclosed and claimed in this application.

Various drivelines in automotive, truck, and certain off-highway applications take power from a central prime mover and distribute the power to the wheels using mechanical devices, such as transmissions, transaxles, propeller shafts, and live axles. These configurations may work well when the prime mover may be bulky or heavy such as, for example, various internal combustion engines. More attention is being directed, however, toward environmental performance and issues relating to alternative energy sources, where the transportation industry is engaged in development of various electric vehicles as next-generation vehicle candidates.

Drive systems that may be used in electric vehicles include two types. The first type relates to a one-motor system in which a motor may be installed in the body of the vehicle and the power may be transmitted to both the left-side and right-side wheels via a differential device and drive shafts. The second type relates to an "on-wheel", "near-wheel", or "in-wheel" motor system in which one or more electric motors may be disposed proximate to, on, or within the vehicle wheels. With respect to such on-wheel motor systems, these systems may be configured without a differential, a drive shaft, or other driveline components necessary for performance of a one-motor system, as on-wheel motors and gear or other mechanical reducers may be installed directly on one or more of the wheels. The on-wheel configuration may significantly reduce layout restrictions imposed by driveline components and may greatly increase the degree of freedom in vehicle design. For example, it may be possible to maximize vehicle interior space and further improve vehicle driving performance through the independent traction control ability of each on-wheel motor. Efficiency may also be improved by minimizing energy loss incurred by driveline components, thereby providing a reduction in power consumption during operation and increasing vehicle range per charge. It should be understood that the electric motor described herein may be used in other fields and applications apart from transportation, such as, but not limited to, robotics or material handling.

Differentials, drive shafts, and other driveline components may work with electric motor prime movers, but the on-wheel configuration may further provide the opportunity to distribute the prime mover function to each or some of the plurality of wheels of electric motor prime movers because of the small size and lighter weight of electric motors in comparison to internal combustion engines. This reduction and/or elimination of mechanical driveline components may result in a lighter-weight vehicle with more space for passengers and payload. However, on-wheel electric motors have a lack of mechanical robustness to survive the harsh on-wheel environment and lack efficiency in converting electric power to mechanical power.

Accordingly, one of the elements to providing an efficient electric motor may be to reduce the gap between the rotor and stator. For electric motors that may not be not in a harsh environment, this may involve providing rotor and stator components with tight mechanical tolerances and a rotor spindle support system strong enough to keep the rotor from contacting the stator while the electric motor may be in operation. For electric motors in a harsh environment, such as an on-wheel motor subject to significant mechanical shock, the spindle support problem may be challenging due to the very high shock and vibration levels that may be experienced in the wheel end of a vehicle. Accordingly, there remains a need for an electric motor that can be used in an on-wheel configuration and is able to withstand the harsh environment encountered in that application and eliminates the axle shaft of the electric motor and replaces it with a supporting film of lubricant.

SUMMARY OF THE DISCLOSURE

This section provides a general summary of the inventive concepts associated with this disclosure and is not intended to be interpreted as a complete and comprehensive listing of all of its aspects, objectives, features and advantages.

The present disclosure relates to an electric motor including a static member and a movable member moveably disposed within the static member to define a gap therebetween. A lubricant is disposed within the gap to provide a supporting film of lubricant between the static member and the movable member for improving the rigidity and reducing the size of the electric motor. The electric motor affords reductions in weight and packaging space of a vehicle drivetrain by configuring the electric motor in an on-wheel position to drive the vehicle, as one or more electric motors may be coupled to one or more wheels for use in various automotive, truck, or off-highway vehicles, or for use in other devices incorporating electric motors.

The static member may be configured as a stator and the movable member may be configured as a rotor such that the static member and movable member may be configured to exert an electromagnetic force therebetween and convert electrical energy into mechanical energy and move the movable member. The lubricant may be provided to the gap through the static member.

In an alternative embodiment, the static member is configured as a plurality of stator coils and the movable member is configured as a band and as a rotor. The moveable member may also be configured to move relative to the static member. The lubricant supported electric motor may include a lubricant disposed in a gap between the plurality of stator coils of the static member and the band of the movable member to support the movable member relative to the static member. The lubricant may be provided to the gap through the static member.

In another alternative embodiment the static member is configured as a stator. The movable member is configured as a drive chain and as a rotor. The movable member may be configured to move relative to the static member.

The present disclosure includes articles of manufacture, systems, and processes that relate to a lubricant supported electric motor where the rotor of the electric motor is supported on the inside by pressurized lubricant, replacing the rotor axle, and on the outside, between the rotor and stator also by pressurized lubricant. By eliminating the rotor axle and replacing it with pressurized lubricant, the rotors can be increased to produce additional torque when compared to a non-lubricant supported electric motor. The generally incompressible lubricant provides a very rigid support mechanism for the rotor with respect to the stator in place of the rotor axle. As a result, the rotor output shaft may be a lightweight cantilever without the need for additional radial stiffness (such as provided by plain bearings in a non-lubricant supported motor) to absorb shock and vibration as well as reduced torsional stiffness for the output torque of the lubricant supported motor. Additionally, the lubricant provides a low-friction surface for the rotor and stator and provides for temperature regulation using a lubricant circulation system.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected aspects and not all possible implementations, and are not intended to limit the scope of the present disclosure.

DETAILED DESCRIPTION OF THE ENABLING EMBODIMENTS

Exemplary aspects will now be described more fully with reference to the accompanying drawings. In particular, a number of non-limiting aspects of vehicle driveline components with a wheel support with or without an end gear reduction unit integrated with a wheel end motor is provided so that this disclosure will be thorough and will fully convey the true and intended scope to those who are skilled in the art. It will be apparent to those skilled in the art that specific details need not be employed, that example aspects may be embodied in many different forms and that neither should be construed to limit the scope of the disclosure. It should also be appreciated that the present disclosure can be utilized in connection with other types of vehicle components not described fully herein.

Figure 1:
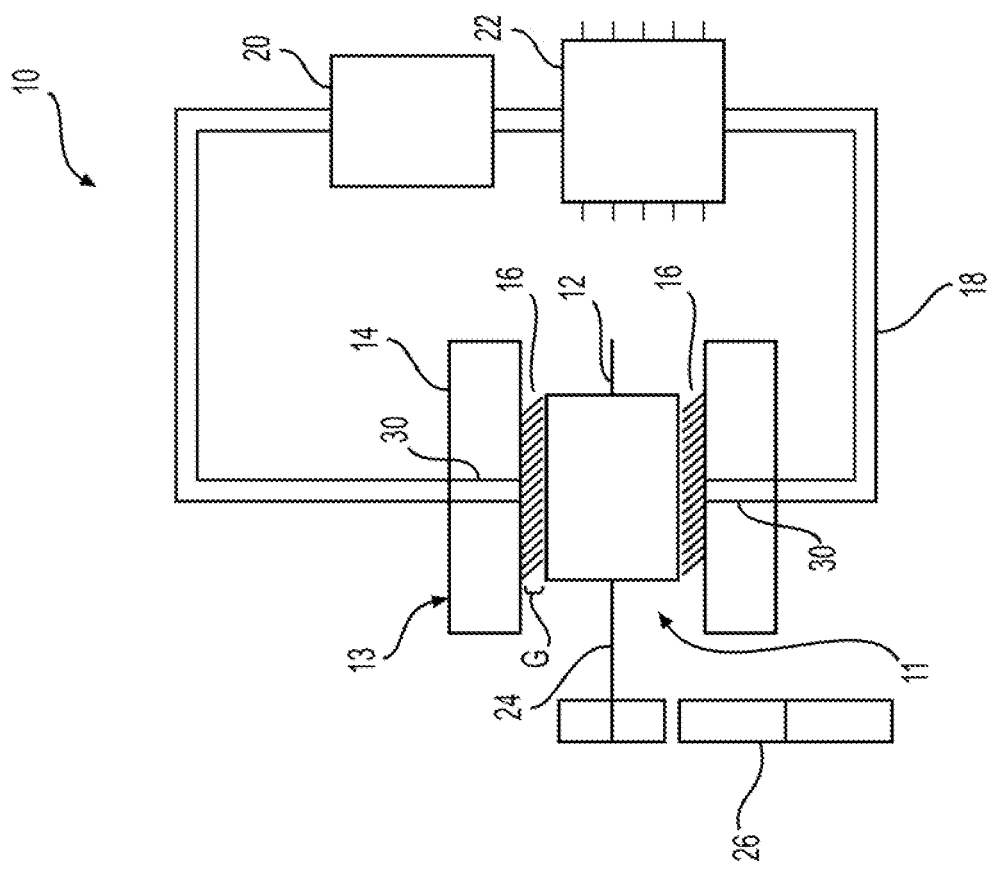
FIG. 1 is a schematic plan view of a lubricant supported electric motor and a drive configuration, according to an aspect of the disclosure.

Referring to FIG. 1, a lubricant supported electric motor 10 is shown having a movable member 11 and a static member 13. The movable member 11 may be configured as a rotor 12 and the static member 13 may be configured as one or more stators 14. The rotor 12 may be configured to move (e.g., rotate) relative to the one or more stators 14. The rotor 12 and the stators 14 may be further configured to exert an electromagnetic force therebetween and to convert electrical energy into mechanical energy when energized that may cause the rotor 12 to move relative to the stators 14. A fluid lubricant 16 is disposed between the rotor 12 and the stators 14. It should be understood that the term "fluid" as used herein includes liquids, gases, plasmas, and plastic solids, or a combination thereof. The lubricant 16 may be configured as a pressurized film such that the lubricant 16 supports the rotor 12 relative to the stators 14. The lubricant 16 may be delivered to the rotor 12 and the stators 14 by a pressurized lubricant system 18. For example, at least one of the static member 11 and the movable member 13 defines at least one passage 30 to distribute lubricant 16 into the gap G between the static member 13 and the movable member 11.

The lubricant system 18 may be configured to provide lubricant 16 to one or more stators 14, for example. The lubricant system 18 may be connected to one or more passages 30 formed in the stators 14. The lubricant system 18 may include a pump 20 that may be configured to pressurize the lubricant 16. Additionally and alternatively, the lubricant supported motor 10 may include self-pumping elements using the rotor 12 and the stators 14 such that the movement of the rotor 12 relative to the stators 14 generates sufficient pressure to circulate the lubricant 16. According to an aspect, the lubricant 16 may be provided by adjacent devices, such an internal combustion engine or a compressor.

According to an aspect, the lubricant system 18 may include the pump 20 and a heat exchanger 22. The heat exchanger 22 may be configured as a radiator or heat pump, for example. The heat exchanger 22 may remove heat from the lubricant 16 circulated through it by the lubricant system 18 and the pump 20. Additionally and alternatively, the temperature of the lubricant 16 may function in a heating capacity and/or may be heated to warm a cold lubricant supported electric motor 10 and/or to reduce the viscosity of the lubricant 16 in a cold environment, such as for an internal combustion engine or for climate control.

According to an aspect, the rotor 12 of the lubricant supported electric motor 10 may be supported on the inside by the pressurized lubricant 16, replacing a rotor axle (not shown), and on the outside, between the rotor 12 and stators 14 also by pressurized lubricant 16. By eliminating the rotor axle and replacing it with pressurized lubricant 16, the size of the rotor 12 may be increased to produce additional torque when compared to a non-lubricant supported electric motor. The generally incompressible lubricant 16 may provide a very rigid support mechanism for the rotor 12 with respect to the stators 14 in place of the rotor axle. As a result, the rotor output shaft 24 may be configured as a lightweight cantilever without the need for additional radial stiffness (such as provided by plain bearings in a non-lubricant supported motor) to absorb shock and vibration as well as reduced torsional stiffness for the output torque of the lubricant supported motor. Additionally, the lubricant 16 may provide a low-friction surface for the rotor 12 and stators 14 and may provide for temperature regulation using the lubricant circulation system 18 that may include the pump 20 and the heat exchanger 22.

Figure 2:
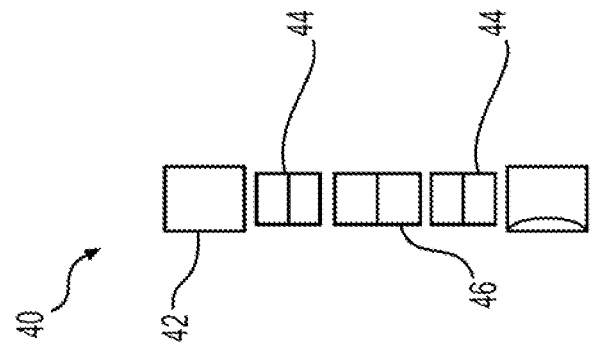
FIG. 2 is a schematic plan view of an exemplary drive configuration of a lubricant supported electric motor, according to an aspect of the disclosure.

Referring now to FIG. 2, in an alternative arrangement the rotor output shaft 24 of the lubricant supported motor 10 may be operably connected with a ring gear 42 surrounding a set of planetary gears 44 with a sun gear 46 disposed in the center.

According to an aspect, the rotor output shaft 24 may be directly connected to a wheel or with some speed reduction (e.g., gears), between the lubricant supported electric motor 10 and the wheel. The speed reducer may be configured with parallel axis gears 26 or with a planetary gear set/final drive 40 including but not limited to the ring gear 42, planetary gears 44, and sun gear 46. Additionally and alternatively, the rotor output shaft 24 may permit shifting from one final drive ratio to another.

According to an aspect, the rotor 12 may be configured with an output shaft 24 that is operably connected to a final drive 40. For example, the final drive 40 can include parallel axis gears 26. The parallel axis gears 26 may be configured to transmit rotational energy to a wheel (not shown). The parallel axis gears 26 may provide one or more reduction ratios between the lubricant supported electric motor 10 and the wheel.

According to an aspect, in addition to supplying motive power in a wheel end, when configured with suitable windings in the stators 14, the lubricant supported electric motor 10 may generate linear motion in the axial direction. This effect of "solenoid" linear motion may be used to actuate for example, friction brakes, operate a final drive ratio shift, or a combination thereof.

According to an aspect, various rotor 12 and stator 14 configurations may be used in the lubricant supported electric motor 10. For example, the lubricant supported electric motor 10 may be configured as one of a radial flux motor and axial flux motor with magnetic circuits including permanent magnets, to use induction currents, to use magnetic reluctance, or to use a combination of permanent magnets and reluctance. Additionally and as alternatively shown in FIG. 3, the lubricant supported electric motor 20 may be configured as an integrated starter alternator drive 60 (ISAD) using a lubricant supported electric motor 10 in a linear motor configuration.

Figure 3:
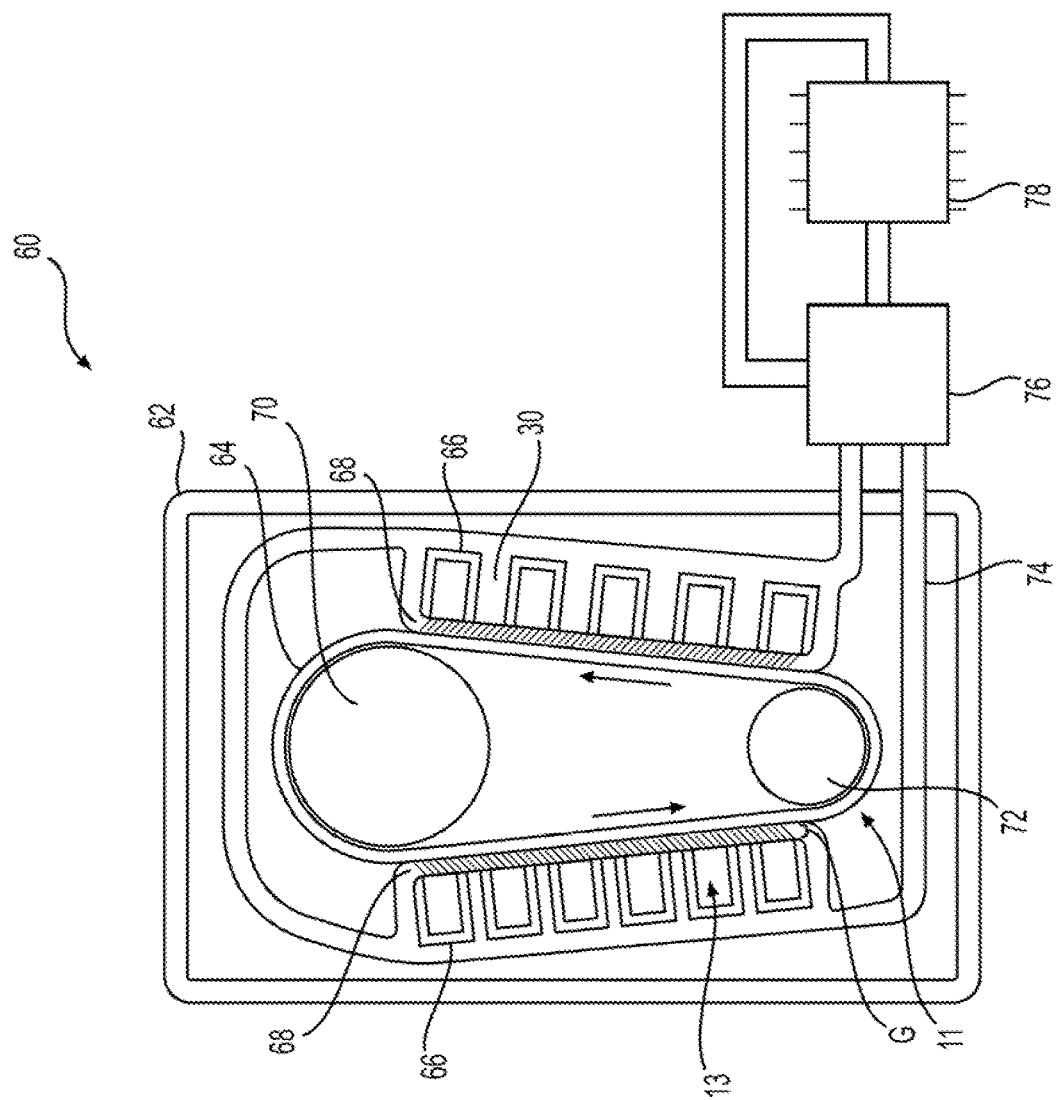
FIG. 3 is a schematic plan view of a cam drive chain used for a starter/alternator configuration for use with a lubricant supported electric motor, according to an aspect of the disclosure.

Referring now to FIG. 3, an ISAD 60 is shown disposed in an internal combustion engine (ICE) 62. According to an aspect, a rotor belt 64 of the linear lubricant supported electric motor 11 may be configured as a timing belt or chain. The rotor 64 may be configured to rotate near a plurality of stators 66 disposed between a cam shaft 70 and a crankshaft 72 of the ICE 62. Additionally and alternatively, the plurality of stators 66 may be disposed about the entire perimeter of the rotor belt 64. According to an aspect, the plurality of stators 66 may be disposed about the interior of the rotor belt 64. A lubricant 68 is disposed between the rotor belt 64 and the plurality of stators 66. The lubricant 68 may be in the form of a pressurized film. The lubricant may be pressurized by a pressurization system 74 including a pump 76 and delivered to a plurality of passages 30 disposed about the stators 66. The pump 76 may be configured within the ICE 62 or outside of the ICE 62 to circulate the lubricant 68 to the rotor belt 64 and the plurality of stators 66. Additionally and alternatively, the lubricant 68 may be pressurized by the ICE 62, such as the lubrication system of the ICE 62. The pressurization system 74 may include a heat exchanger 78 that is in fluid communication with the lubricant 68. The heat exchanger 78 may be configured to remove heat from the lubricant 68, for example. According to an aspect, the heat exchanger 78 may be configured to provide heat to the ISAD 60, such as in a cold environment.

According to an aspect, the lubricant 68 may be pressurized by the rotational movement of the rotor belt 64 relative to the plurality of stators 66. For example, the movable member 11 can be a rotor belt 64 and the static member 13 can be plurality of stators 66 may configured to generate suction that may distribute the lubricant 68 about the opposing surfaces of the rotor belt 64 and the plurality of stators 66 in the gap G. The suction may be sufficient to circulate the lubricant 68 to the heat exchanger 78 to remove heat from the lubricant 68.

Figure 4:
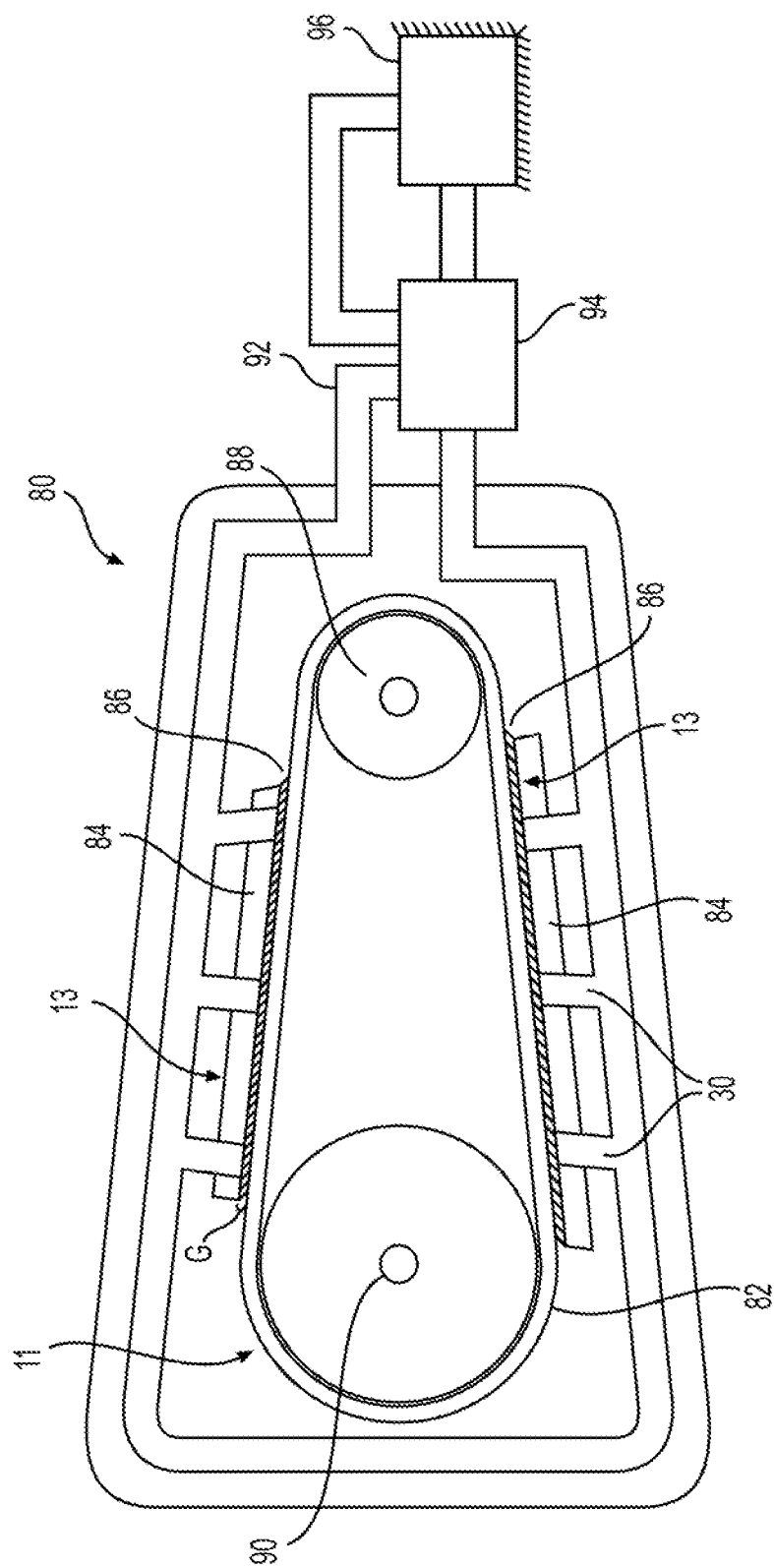
FIG. 4 is a schematic plan view of a linear drive integrated into a suspension trailer arm for a lubricant supported electric motor, according to an aspect of the disclosure.

Referring now to FIG. 4, in an alternative arrangement, a wheel-end drivetrain (trailing-arm suspension) 80 is shown including a linear lubricant supported motor 11 configured as a linear motor. A movable member 11 can be a rotor chain 82 is configured as a drive chain and be positioned to interact with a static member 13 that can be configured as pair of stators 84. The lubricant 86 may be provided between the rotor chain 82 and the pair of stators 84 via passages 30. The rotor chain 82 may be configured to rotate about an idler pulley 88 and a wheel end spindle 90. The idler pulley 88 and the wheel end spindle 90 are configured to maintain the rotor chain 82 in proximity to the stators 84 such that the film of the lubricant 86 supports the rotor chain 82 relative to the stators 84. The lubricant 86 may be provided to the stators 84 by a lubrication system 92. The lubrication system 92 may include a pump 94 which may be configured to circulate the lubricant 86 through the lubrication system 92. A heat exchanger 96 may be configured with the lubrication system 92 to remove heat from the lubricant 86. Additionally and alternatively, the lubricant 86 may be provided by another component connected to or in fluid communication with the wheel-end drivetrain 80.

According to an aspect, the rotor chain 82 may be outfitted with suitable magnets or magnetic circuits to enable a set of stationary windings of the pair of stators 84 to exert a drive force on the rotor chain 82.

According to an aspect, the wheel-end drivetrain 80 may be configured as a prime mover for a vehicle. For example, the wheel end drivetrain 80 may be integrated into a suspension trailing arm to provide tractive effort. This integration may have the advantage of reducing some of the prime mover mass as part of the un-sprung mass of the wheel-end drivetrain 80. Additionally and alternatively, the wheel-end drivetrain 80 configuration may also offer packaging efficiencies due to the double use of the suspension trailing arm.

Obviously, many modifications and variations of the present disclosure are possible in light of the above teachings and may be practiced otherwise than as specifically described while within the scope of the appended claims. Individual elements or features of a particular aspect are generally not limited to that particular aspect, but, where applicable, are interchangeable and may be used in a selected aspect, even if not specifically shown or described.

What is claimed is:

1. An electric motor comprising:
 a static member configured as a plurality of stator coils;
 a movable member including a rotor chain having at least one magnet or magnetic circuit and configured to rotate about an idler pulley and a wheel spindle while being movably disposed within the stator to define a gap therebetween, the static member and movable member configured to exert an electromagnetic force therebetween and convert electrical energy into mechanical energy and move the movable member; and
 a lubricant disposed in the gap between the plurality of stator coils of the static member and the rotor chain of the movable member to support the movable member relative to the static member.

2. The electric motor of claim 1, wherein one of the stator or the rotor defines a passageway disposed in fluid communication with the gap for introducing the lubricant.

3. The electric motor of claim 2, wherein the stator defines the passageway.

4. The electric motor of claim 1, further comprising a pump disposed in fluid communication with the passageway for introducing the lubricant into the gap.

5. The electric motor of claim 1, further comprising at least one of a heat exchanger, a heat sink, and a radiator in fluid communication with the lubricant.

6. The electric motor of claim 1, wherein the idler pulley and the wheel spindle are for a trailing arm suspension.

* * * * *